United States Patent
Roedel et al.

(10) Patent No.: US 12,120,161 B2
(45) Date of Patent: *Oct. 15, 2024

(54) PROMOTION OF USERS IN COLLABORATION SESSIONS

(71) Applicant: MICROSOFT TECHNOLOGY LICENSING, LLC, Redmond, WA (US)

(72) Inventors: Dominic Roedel, Prague (CZ); Marina Brebric, Prague (CZ); Ana Chetrari, Prague (CZ)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/483,229

(22) Filed: Oct. 9, 2023

(65) Prior Publication Data
US 2024/0039975 A1  Feb. 1, 2024

Related U.S. Application Data

(63) Continuation of application No. 17/116,994, filed on Dec. 9, 2020, now Pat. No. 11,824,647.

(51) Int. Cl.
*G06F 9/451* (2018.01)
*G06F 3/01* (2006.01)
*H04L 65/4038* (2022.01)
*H04N 7/15* (2006.01)

(52) U.S. Cl.
CPC .......... *H04L 65/4038* (2013.01); *G06F 3/017* (2013.01); *G06F 9/451* (2018.02); *H04N 7/152* (2013.01)

(58) Field of Classification Search
CPC ..... H04L 65/4038; G06F 3/017; G06F 9/451; H04N 7/152; G06Q 10/06311
See application file for complete search history.

(56) References Cited

U.S. PATENT DOCUMENTS

| | | | |
|---|---|---|---|
| 8,380,237 B2* | 2/2013 | Plestid | H04W 72/30 455/518 |
| 8,754,926 B1* | 6/2014 | Gossweiler | H04N 7/15 348/14.09 |
| 9,729,823 B2* | 8/2017 | Meek | H04L 65/403 |
| 10,999,555 B1* | 5/2021 | Mautino | H04N 7/147 |
| 2004/0225716 A1* | 11/2004 | Shamir | H04L 9/40 709/204 |

(Continued)

OTHER PUBLICATIONS

Final Office Action Issued in U.S. Appl. No. 17/116,994, mailed Mar. 7, 2022, 23 pages.

(Continued)

*Primary Examiner* — Yongjia Pan
(74) *Attorney, Agent, or Firm* — Han Gim; Newport IP, LLC

(57) ABSTRACT

The techniques disclosed herein improve existing systems by monitoring data indicative of the communication session and identifying a predefined trigger indicative of a desired engagement level of a user with respect to the communication session. A promotion action is determined that corresponds to the predefined trigger. In response to confirmation of the promotion action, the user is promoted on the user interface in accordance with the promotion action.

20 Claims, 16 Drawing Sheets

(56) References Cited

U.S. PATENT DOCUMENTS

| | | | |
|---|---|---|---|
| 2007/0263824 A1* | 11/2007 | Bangalore | H04L 12/1827 379/202.01 |
| 2012/0182384 A1* | 7/2012 | Anderson | H04L 65/4046 348/14.09 |
| 2013/0191454 A1 | 7/2013 | Oliver et al. | |
| 2017/0353508 A1* | 12/2017 | Yoakum | H04L 65/4038 |
| 2021/0176429 A1* | 6/2021 | Peters | G06V 20/41 |

OTHER PUBLICATIONS

Montelli, "How to Raise a Hand an Google Meet to Help Prevent People From Talking Over Each Other in a Meeting," https:/www.businessinsider.nl/how-to-raise-a-hand-in-google-meet-to-help-prevent-people-from-talking-over-each-other-in-a-meeting/, downloaded Jan. 27, 2023, 6 pages.

Non Final Office Action Issued in U.S. Appl. No. 17/116,994, mailed Nov. 29, 2022, 23 pages.

Non-Final Office Action Issued in U.S. Appl. No. 17/116,994, mailed Oct. 4, 2021, 21 pages.

* cited by examiner

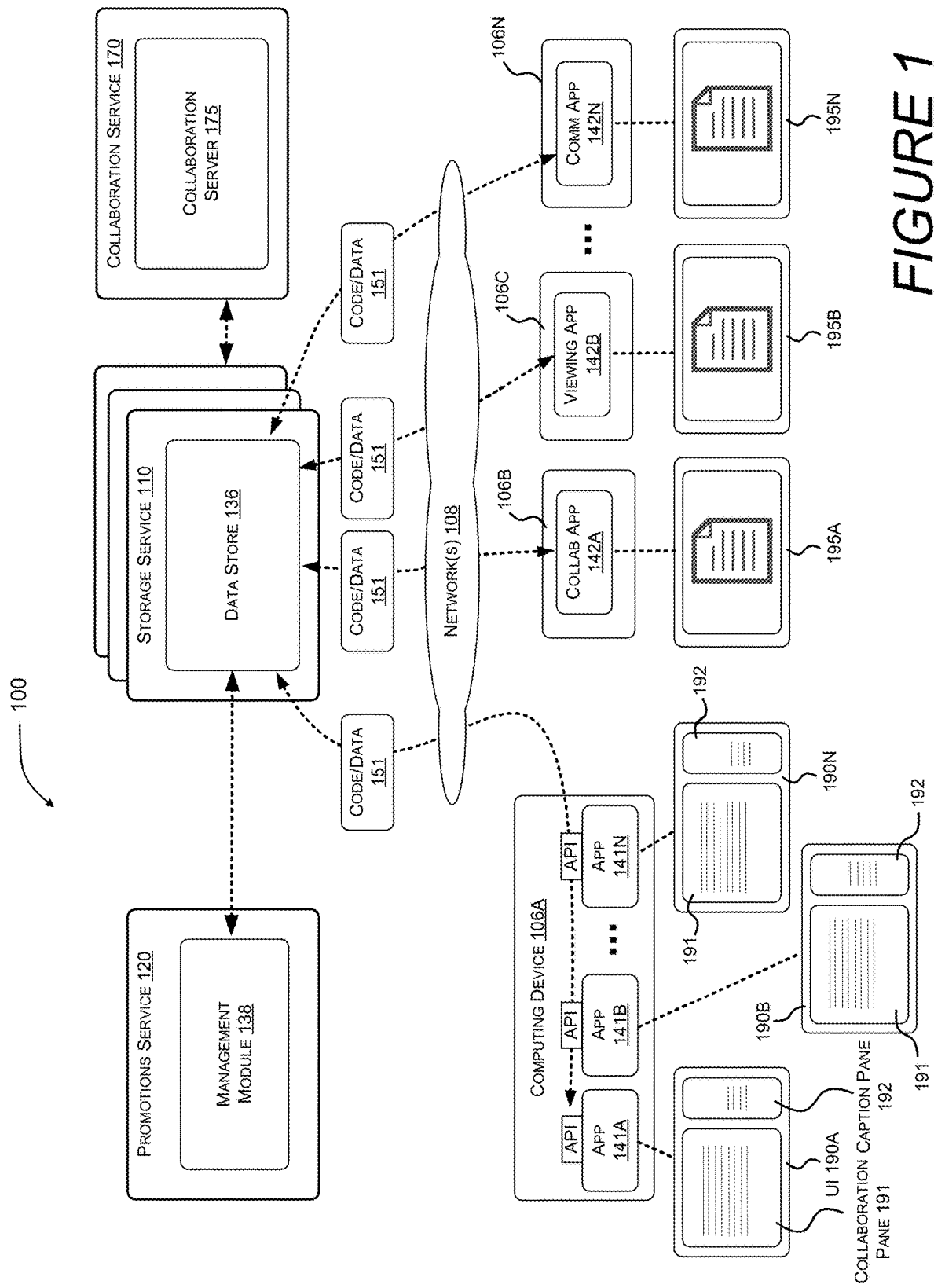

| ID | Description (text) | Categories | Role | Modified (timedate) | Weight |
|---|---|---|---|---|---|
| 1273893 | Comment submitted | 1, 3 | all | 15/9/2018 18:31 | 3 |
| 1273894 | Voice detected | 1, 3, 4 | invited | 15/9/2018 18:32 | 2 |
| 1273895 | Hand raised | 1, 2, 3 | all | 15/9/2018 18:33 | 1 |

500

PROMOTION OF USERS IN COLLABORATION SESSIONS

CROSS-REFERENCE TO RELATED APPLICATION

This application is a continuation of U.S. patent application Ser. No. 17/116,994, filed Dec. 9, 2020, the content of which application is hereby expressly incorporated herein by reference in its entirety.

BACKGROUND

There are a number of systems and applications that provide features that assist users with communications features on their devices. For example, some systems allow users to communicate and collaborate using live video streams, live audio streams, and other forms of real-time, text-based, or image-based applications. Although there are a number of different types of systems and applications that assist users to communicate and interact, users may not always be enabled to participate in a manner that is consistent with their intended level of participation. For example, if a user wished to contribute to a meeting but is not able to invoke desired features that fully enable the user's desired level of participation, such as using the microphone or camera, then the features may not be activated when needed.

Systems that do not readily enable such users to activate such features can cause a host of issues and negatively impact the effectiveness and accessibility of a communication system in such scenarios. Computing devices that do not facilitate the use of features can lead to production loss and inefficiencies with respect to a number of computing resources. For instance, participants of a communication session, such as an online meeting, may need to refer to recordings or other resources when live content is missed or overlooked. Content may need to be re-sent when participants miss salient points or cues during a live meeting. Participants may also have to re-watch content when they miss salient points or cues during a viewing of a recorded presentation. Such activities can lead to inefficient use a network, processor, memory, or other computing resources. Also, when a participant's level of engagement is negatively impacted during a meeting, such a loss of production may cause a need for prolonged meetings or follow-up meetings, which in turn take additional computing resources. Such inefficiencies can be exacerbated when a system is used to provide a collaborative environment for a large number of participants.

In addition to a loss in user engagement, a number of resource inefficiencies can result when communication systems do not effectively enable the use of features that assist users to communicate with the systems. Participants can miss important cues which can sometimes require the participants to manually interact with a number of different systems. For example, participants who miss important cues may start to utilize additional computing resources to communicate using text messages, emails, or other forms of communication. Such manual steps can be disruptive to a user's workflow and highly inefficient when it comes to helping a user establish a collaboration protocol with a group of participants. Such drawbacks of existing systems can lead to loss of productivity as well as inefficient use of computing resources.

SUMMARY

The techniques disclosed herein provide users with a way to automatically promote participants of a collaboration session. In response to the promotion, the promoted participant may be visually or otherwise enhanced on the user interfaces of participants of the collaboration session. Furthermore, privileges of the promoted participant may be automatically modified to include added or changed permissions for various features of the collaboration session.

Visually promoting users to the session participants is typically performed based on participation logic, where the most active participants may be selected to represent the meeting or otherwise be presented to the session participants. Users that are not able to contribute in the same manner as promoted users due to the moderated nature of the meeting may not be visually or otherwise prominent to other participants. In some scenarios, selected participants may be pinned to a screen, but this is typically a local change that must be performed manually. While systems may allow for the spotlighting of selected participants, this is a manual action that must be performed deliberately and is typically dependent upon user action with regard to the context of the session. In some cases, the sound level of a participant who is speaking into the microphone may be highlighted, but there is no other consideration given to the context of the session, and there is typically no corresponding change to the privileges of the highlighted participant.

The techniques described herein may be used in the context of various types of settings for system features that facilitate communications between a user and a computing device via various interfaces. Such settings typically involve visual interfaces such as those rendered on a graphical user interface, audio interfaces such as an audio speaker, and tactile interfaces such as a vibration device. In some examples, the techniques may be applied to a subset of settings that pertain to a particular grouping or classification of settings. The described techniques may be implemented to settings generally, or to a subset of settings as described. By applying the described techniques to a specified subset of settings, the system can provide more flexible options to the user for applying various groupings of settings to the user's devices and systems.

During the lifecycle of a collaborative session, a moderator or other selected participant may select, edit and save promotion settings as a signal or response to the system. Any edits or changes by the moderator may be fed back to the system for analysis and execution of the edits or changes and updating of the promotion settings.

In some embodiments, promotion settings may be communicated to the system via responses to user interface prompts or other input means. When the collaborative session begins, the system may automatically read or otherwise access the promotion settings and integrate the settings with the collaborative session application.

In one embodiment, the promotion settings may be learned using machine learning or other analytical means to provide intelligent promotion actions. In one example, the system may collect promotion settings that are selected by the meeting moderator during a collaboration session. The collected settings may be sent to a promotion settings engine that may detect patterns for selected promotion settings as they relate to the context of a communication session. The promotion settings engine may determine typical promotion settings for various meeting situations and automatically prompt the moderator or apply the learned settings in configuring and rendering content to user devices during the current or at a future meeting.

The techniques described above can lead to more efficient use of computing resources. In particular, by automating a process for facilitating participant promotion settings, user interaction with the computing device can be improved. The techniques disclosed herein can lead to a more efficient use of computing resources by eliminating the need for a person to perform a number of manual steps to repeatedly search, discover, review, display, and select various settings, which may be different for each application and system. The reduction of manual processes and the reduction of a need for manual entry can lead to fewer inadvertent inputs and errors. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. References made to individual items of a plurality of items can use a reference number with a letter of a sequence of letters to refer to each individual item. Generic references to the items may use the specific reference number without the sequence of letters. The same reference numbers in different figures indicate similar or identical items.

FIG. 1 illustrates aspects of a system for managing promotion settings.

DETAILED DESCRIPTION

Figure 2A:
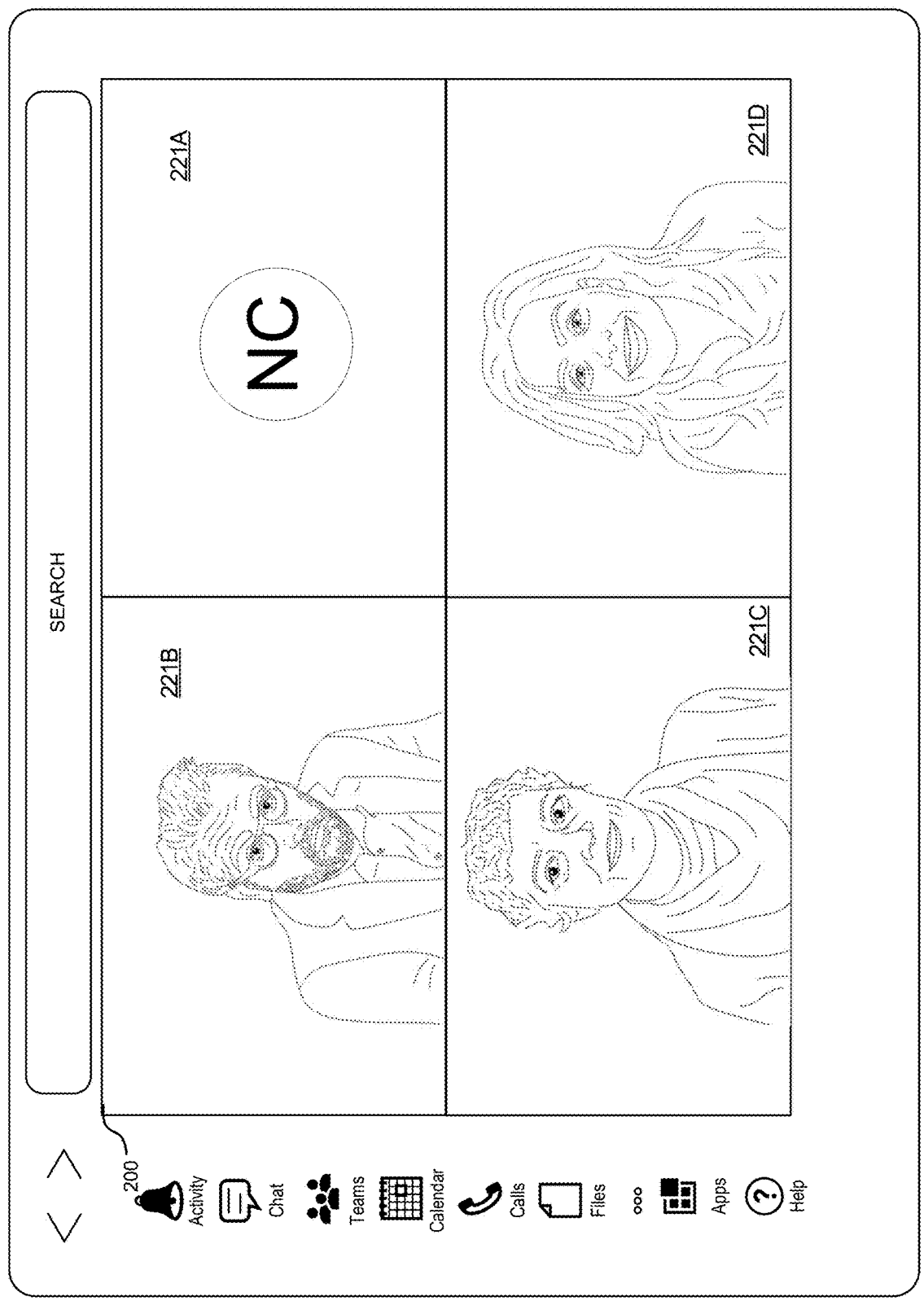
FIG. 2A illustrates an example user interface in accordance with an embodiment.

The techniques disclosed herein provide systems with a way to efficiently configure promotion settings that may be used to configure functions and applications on a computing system, especially when used for communications sessions.

Technical problems encountered when configuring promotion settings include a lack of standardization and automation for how session participants are to be visually and functionally promoted, which can result in promotion settings having to be searched for, entered, stored, and processed. Lack of standardization and automation can further lead to systems and applications being inconsistently configured, which can create conflicts when running various features and applications. Furthermore, lack of a consistent and automated process for inputting and processing promotion settings may result in users having to repeatedly interrupt processes in order to enter and communicate promotion settings information, thereby consuming additional computing, storage, and network resources.

The technical problems solved by the techniques described herein include lack of or inefficient computing for receiving, applying, and maintaining promotion settings for communications applications. Technical effects achieved include improvements over conventional systems for accessing and applying promotion settings by reducing the amount of code executed by computing systems in order to execute processes for generating interfaces that allow a user to search for and enter inputs. Technical effects further include reducing the amount of storage used by computing systems to store promotion settings information for multiple applications and functions. As a result, such systems and methods can significantly reduce memory utilization when managing settings for a user. Additionally, the described techniques may further reduce use of resources because the selection and promotion of one or a few participants can allow the system to only present the promoted participants rather than rendering video streams with all meeting participants, thus saving bandwidth as well as processing and storage resources.

Systems and methods consistent with the present disclosure achieve the benefits noted above by implementing a system configured to provide users with a way to efficiently or automatically promote participants of a collaboration session. In response to the promotion, the privileges of the promoted participant may be efficiently or automatically modified to include added or changed permissions for various features of the collaboration session.

The patent describes a technical solution to visually promote an online meeting participant with respect to other participants, and to update the promoted participant's permission level. The updated permission level may be automatic or based on moderation by an authorized user.

In moderated meeting scenarios, such as a panel, a live event, or in education scenarios, meeting participants often are not provided full participation capabilities and provided limited ways to contribute. For example, the microphone and camera may be disabled for most participants, who may be limited to providing input via a chat feature. In online meeting platforms that display individual participants based on their contribution (e.g., whether they are speaking or if they have their cameras on), the continued exclusion of non-promoted participants may hinder the meeting experience for those participants and may cause those participants to experience less presence and participation at such meetings.

In various embodiments, the present disclosure provides a way to provide visibility (e.g., promotion on rendered UIs of a collaboration session) of individuals to other meeting participants based on their intent/need to participate in moderated scenarios and provide participants with necessary permissions to contribute in a manner that is consistent with their promotion levels. In some embodiments, a UI component is provided that determines a level of participation that can be inferred for a desired level that participants wish to contribute. For example, during a Q&A panel, users may be able to ask questions and raise points for discussion. The comments may be presented to the meeting organizer or presenter. In some systems, the organizer or presenter may select a comment, and the system may promote, or generate a prompt requesting input if the participant associated with the selected comment should be promoted.

During the selection of a participant's input, if the organizer or presenter promotes the participant, the system may activate one or more of the following features for the promoted participant:
  Visually promote the participant to be visibly enhanced with respect to other participants in the communications session UI
  Grant input access to use the microphone
  Grant input access to use the camera and related effects
  Automatically apply background effects (e.g., highlight that the participant is outside the organization or is a guest speaker)
  Prominent display of name, role, and other personal information (e.g., organization and location)
  The participant's question or comment is prominently displayed to other meeting participants in the communications session UI By bundling various promotion features such as visual promotion and feature promotion with permissions, a seamless transition can be provided between promotion states, allowing the meeting organizers and/or presenters to ensure that the right person is participating at the appropriate participation level at the right time without the need to manually configure the participant's promotion levels. Additionally, other meeting participants can be assured that they will be promoted at the right time based on their actions during the communications session.

Triggers that can be used to perform automated visual and permission-based promotion as disclosed herein can include:
  Users providing input to indicate intent to participate or desire to be selected to further participate in a meeting (e.g., Q&A panel)
  Users with an assigned role in a meeting (e.g., speaker, audience) may be automatically promoted when joining the meeting (e.g., a participant with a "panelist" role may always be visually promoted (e.g., "spotlighted"))
  Agenda item of the meeting (e.g., the participant is assigned to an agenda topic); may further be based on predefined agenda times and/or time slots.
  Schedule/time of the meeting (e.g., participants are assigned X minutes in a meeting)
  Presenting in a meeting (e.g., participant who begins sharing information is automatically promoted)
  Allowing a participant to speak (e.g., granting microphone access) may automatically cause promotion of the participant
  Identification of a dominant participant based on the time length and/or volume level of the participant's vocal input
  Identification of a participant's spoken input as indicating a desire to be promoted (e.g., using voice recognition)
  Detection of a participant's lack of input (e.g., based on length of time without participant input), which may result in demotion or removal of a current promotion level.
  Detection of a participant's hand or other gestures based on image recognition (e.g., a participant detected as using sign language may be promoted)

The types of features that may be activated or otherwise permitted may be selected based on capabilities that can enhance a participant's level of engagement with a communications session based on the context of the session. Features may be grouped and multiple groupings may be available for activation for a promoted participant. For example, during a live event it may be desirable to only grant microphone access but not video access, if the context is a Q&A session.

In some embodiments, the moderator of the meeting may be provided the option to confirm the promotion of a participant. In some embodiments, a participant may be automatically promoted without further input from the moderator. Promotion of participants may further be modified based on preferences that may be configured by the moderator or an administrator.

Configurable features may include keeping a participant continuously promoted when the participant is actively participating. Promotion may also be based on the participant's role. For example, a known and pre-authorized participant may be automatically promoted, whereas unauthorized participants may only be promoted when confirmed by the moderator.

In some embodiments, different levels of visual promotion may be activated. For example, the submission of a question from a participant may cause a first level of promotion. If the organizer selects the participant's question, a further level of promotion may be triggered. The moderator may additionally be prompted to further increase the promotion level if available.

In some embodiments, the triggers described above may be associated with a rank that may be used to determine promotion levels. In some embodiments, when a meeting is started, the meeting description and roles may be parsed to determine if any triggers are present. As the meeting progresses, the inputs to the meeting may be continuously analyzed to identify triggers. When a trigger is identified, the trigger may be sent to the collaboration system with a value or other indications of the type of trigger and the associated participant.

If multiple triggers are detected, the triggers may be compared and ranked. In some embodiments, the highest-ranking trigger may be promoted. In some embodiments, the ranked triggers may be promoted in order, beginning with the highest ranking. For example, if user A is already spotlighted as determined by the meeting schedule, but user B begins to share content, then user B may take over the spotlight. Once user B stops sharing content, the spotlight may return to the user currently active according to the meeting schedule.

As the meeting continues and new triggers arise, the new triggers may also be analyzed and sent to the collaboration system. If a previously identified trigger is no longer valid (e.g., the participant stops sharing content, the participant leaves the meeting, etc.), those triggers may be removed from the current list of triggers. Triggers may be analyzed locally on a user's device, by the system providing the collaboration session, or a combination.

In some embodiments, the collaboration system may have default promotions. For example, if there is a single presenter or organizer of the meeting, the single presenter or organizer may be visually promoted until a new trigger is detected.

Technical problems encountered when configuring settings include a lack of standardization for promotion of users between system and applications, which can result in multiple versions of promotion settings information having to be entered, stored, and processed. Lack of standardization can further lead to systems and applications being inconsistently configured which can create conflicts when running various features and applications. Furthermore, lack of a consistent and standardized process for inputting and processing promotion settings may result in users having to repeatedly interrupt processes in order to enter and communicate promotion settings information, thereby consuming additional computing, storage, and network resources. The technical problems solved by the techniques described herein include lack of or inefficient computing for receiving, applying, and maintaining promotion settings for communications applications. Technical effects achieved include improvements over conventional systems for obtaining and applying settings by reducing the amount of code executed by computing systems in order to request or access promotion settings and to execute processes for generating interfaces that receive user inputs. Technical effects further include reducing the amount of storage used by computing systems to store promotion settings information for multiple applications and functions. As a result, such systems and methods can significantly reduce memory utilization when managing settings for a user.

Systems and methods consistent with the present disclosure achieve the benefits noted above by implementing a system configured to obtain or automatically promotion setting information across various operating system (OS) settings, devices, user settings, profiles, regions/locations, etc. and automatically adapt and integrate the promotion information for incorporation into online meeting experiences. For example, during a current meeting or interaction experience, if the system identifies contextual changes that trigger a possible promotion of a user, then the system may automatically prompt the moderator to confirm promotion settings for the user related to spotlighting or microphone access. As another example, if a user specifies certain promotion settings for spotlighting or microphone access at the OS level, then the system may automatically inform the user's active meeting settings of those contextual changes for any current meeting or interaction experiences. In some embodiments, the system may also pass the same settings information to third party applications.

In some embodiments, user settings may be communicated to the system during the creation of a meeting. At the meeting time, the system may automatically read the setting signals and integrate the settings with the active meeting software. During the meeting lifecycle, the moderator may select, edit and save preferences as a signal or response to the system. Any edits or changes by the moderator may be fed back to the system for analysis of the edits or changes. In some embodiments, a machine learning engine may be used to learn the promotion triggers and promotion settings.

In some embodiments, a standard interface may be defined for obtaining, storing, and sharing promotion settings between the system and first, second, and third party applications, as well as remote systems and devices.

In one embodiment, settings unique to users in a communication session may be adaptively applied. A data processing system may generate a user prompt on a display device during a communication session. The user prompt may include embedded machine-executable instructions which, upon execution by a computing device corresponding to a user of the communication session, cause the device to collect promotion settings from the computing device.

The promotion settings may, for example, be usable to configure one or more computer-implemented functions for assisting the user to interact with interfaces of the device during the communication session. In some embodiments, the promotion settings may be saved as a promotion settings profile that may be saved for use in other meetings and by other applications.

The promotion settings may include settings for one or more functions of one or more applications. The functions may be automatically configured in interacting with the data processing system during the communication session by applying the promotion settings. In some embodiments, functions for additional users may be automatically configured on additional respective computing devices to interact with the data processing system during the communication session by applying received settings that are unique to the additional users.

In an embodiment, user promotion settings may be collected over a series of meetings and other activities. The system may collect received settings that have been configured by the moderator over the course of the communications session. The system may store the settings as a promotion profile associated with the moderator, meeting, or meeting type. Additionally, the system may learn the settings and use the settings to make predictions for the future meetings based on past settings. For example, predicted promotion settings may be used to configure promotion settings for meetings for which the moderator has not specifically selected settings. In one embodiment, the system may present the proposed settings to the moderator for confirmation or editing.

In an embodiment, applications that do not have promotion settings for a meeting may submit a request for the settings. For example, a third-party application may submit a request for the promotion settings to a standard interface such as an API. The third-party application may receive the promotion settings and integrate the settings into its configuration.

Additionally, the system may obtain settings from the third-party application if the settings have been previously provided to the third-party application by the moderator.

In an embodiment, the promotion settings may be stored as general settings that can be accessed by any first, second, or third party functions and applications. The system may, if permissions are in place, provide the promotion settings to any requesting applications and functions for configuration of their settings.

In an embodiment, the promotion settings may be provided as a general and universal set of preferences that may be applied in whole or in part for any application. In one embodiment, the user may be provided an option to automatically provide the promotion settings as a universal preference. For example, the user may be provided such an option as an initial setting when the system or application is initially configured.

In an embodiment, the promotion settings may be invoked when a call or meeting or any other application that may use the promotion settings is executed.

In one embodiment, the promotion settings may be saved and used as a portable set of configurations. For example, the promotion settings for a moderator may be stored by a service in the cloud and may be provided whenever the moderator is on a device and has been authenticated. The device may connect to the user's account in the cloud and download the promotion settings.

In some embodiments, the promotion settings may be accessed and activated based on identification of the user in new locations. For example, when the moderator is identified in a meeting room in a work environment, the device being used by the moderator may obtain the moderator's settings based on identification of the user and accessing the user's promotion settings from the cloud.

In some embodiments, multiple promotion profiles may be provided for a user.

In one implementation, a bot or agent may be joined to an application instance such as a meeting instance of a collaboration program. The bot or agent may act on behalf of a user, obtaining the user's settings and providing the settings to the application instance. Similarly, the bot or agent may provide the settings to other functions and applications.

In some embodiments, the system may request a number of authorizations from the user, including acceptance of privacy awareness. The user may accept a privacy issue in order to enable the service.

In some embodiments, the promotion settings can be role-based. For example, the promotion settings may be specific to an individual moderator, and some settings may be applicable to a group of users, for example members of an organization. In some embodiments, one or more roles may be defined that can be automatically assigned to a user based on one or more characteristics. For example, if a user identifies as being part of an organization or as a meeting panelist, a role can be automatically assigned to that user. The role can allow the user to be associated with a grouping of settings that are commonly invoked for users who are meeting panelists.

In an example implementation, an entity such as an enterprise can offer a number of predetermined sets of settings for one or more types or roles of users. A particular user may opt in to identify as having a particular role and/or accept a selected set of settings. Once opted in, the user may automatically be enrolled by one or more enterprise systems. The systems may automatically trigger the settings. The settings may be associated with the user and provided to systems and applications as the user participates in meetings and other activities where the user invokes applications that provide settings. The user's settings may be automatically shared with other services as needed. The settings may be transferred to various applications and systems, such as those in connected meeting rooms, various user devices and services.

In some embodiments, the user's settings can be permanently associated with the user as a profile that is bound to the user and can be made available to a plurality of applications and systems.

In some embodiments, the system can determine, based on the context of the user, that the user should be prompted as to whether settings from the user's settings should be applied to the current context. The determination can be made based on usage and monitoring of the user's selections and other actions. For example, if the user has not previously selected spotlighting of an active panelist as a permanent setting, but has selected the option in the past three application instances, the user may be prompted as to whether spotlighting of an active panelist should be saved as a permanent setting.

While many of the described examples are provided in the context of certain settings, the disclosed embodiments may be applied any type of settings and preferences, such as interactive and visual settings including spotlighting, microphone access, camera access, and the like. In general, the described techniques may be applied to any type of setting the enables a meeting experience to visually or otherwise promote one or more users related to participation in the use of device features and features related to various applications and systems.

FIG. 1 illustrates a system 100 for enabling the generation, storage, and updating of promotion settings from applications 141 and doing so while enabling a user to work within a contextual environment of each application 141. In this example, a user can interact with an individual application 141 to launch and participate in applications such as a communications session and edit and add settings that can be used to configure the applications and communications sessions. The applications 141 may each be configured to display a collaboration pane 191 and, in one example, a caption pane 192. Various content pertaining to a collaboration session may be displayed in the collaboration pane 191. In the illustrated example, a user may receive questions, comments, and other data for the communication session. Other communicative features for facility functionality may be invoked in other examples. The caption pane 192 of each application 141 may be synchronized to enable a user to receive renderings of text for application 141.

The use of a caption pane 192 is one example implementation, and other types of communications settings may be enabled and provided on computing devices 106. The applications 141 may receive and send code/data 151. In some configurations, the code/data 151 can be in the form of text, images, media or any other form of data. In some embodiments, the code/data 151 can include code or script. The promotions service 120 may maintain promotion information for system and device settings via applications 141 and can send, for example, a user prompt to a computing device 106A. The prompt may be embedded with scripts or control code for collecting promotion settings from the computing device 106A (e.g., inputs from a moderator). The promotions service 120 may also monitor video, audio, and other data being communicated during a communications session and identify triggers that can cause a prompt to be sent to a moderator, or for promotion settings to be automatically invoked. The computing device 106A may receive moderator inputs for promotion settings and send the settings to the promotions service 120 as part of, for example, a process in response to a trigger. In response to a request to promote a user, the collaboration service 170 may apply the promotion settings in configuring and rendering content to the computing device 106.

The code/data 151 can include data that is stored within storage service 110 including a data store 136 and managed by management service 120 comprising a management module 138. In some embodiments, code/data 151 can include code or other logic that is integrated into, or linked to, the code/data 151.

The code/data 151 can be communicated to any number of computing devices 106, referred to herein as computing devices 106B-106N, from a first computing device 106A or the service 110 via a network 108. Each computing device 106B-106N associated with a recipient can display the code/data 151 on a user interface 195 (195A-195N) by the use of a viewing application 142. The viewing application 142 can be any suitable application such as a presentation program, a web browser, a media player, etc. The viewing application 142 may also be a web-based application. In one embodiment, the viewing application 142 may be a virtual assistant that uses voice instead of a visual representation to convey data content, e.g., facilitating text-to-speech (TTS). In some embodiments, the viewing application 142 may be an augmented reality, mixed reality, or virtual reality device and the code/data 151 can be rendered within a virtual reality display.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable a user with certain impairments to view and interact with data in a wide range of communications and collaborative scenarios while operating a computing device. In addition, improved human interaction improves other computing resources such as processor and network resources, e.g., users can work from a reduced number of applications and reduce a user's computer interaction, reduce the chances of an inadvertent input, reduce network traffic, and reduce computational cycles. The techniques disclosed herein reduce the need to pause applications, reconfigure settings, incorporate updates for, and toggle between, a number of applications, including a specialized presentation program. Other technical effects other than those mentioned herein can also be realized from implementations of the technologies disclosed herein.

Turning to FIG. 2A, illustrated is an example user interface 200 showing a collaborative session including four participants 221A, 221B, 221C, and 221D. The collaborative session may default to standard promotion settings and may not include, initially, promotions such as spotlighting for any of the users.

Figure 2B:
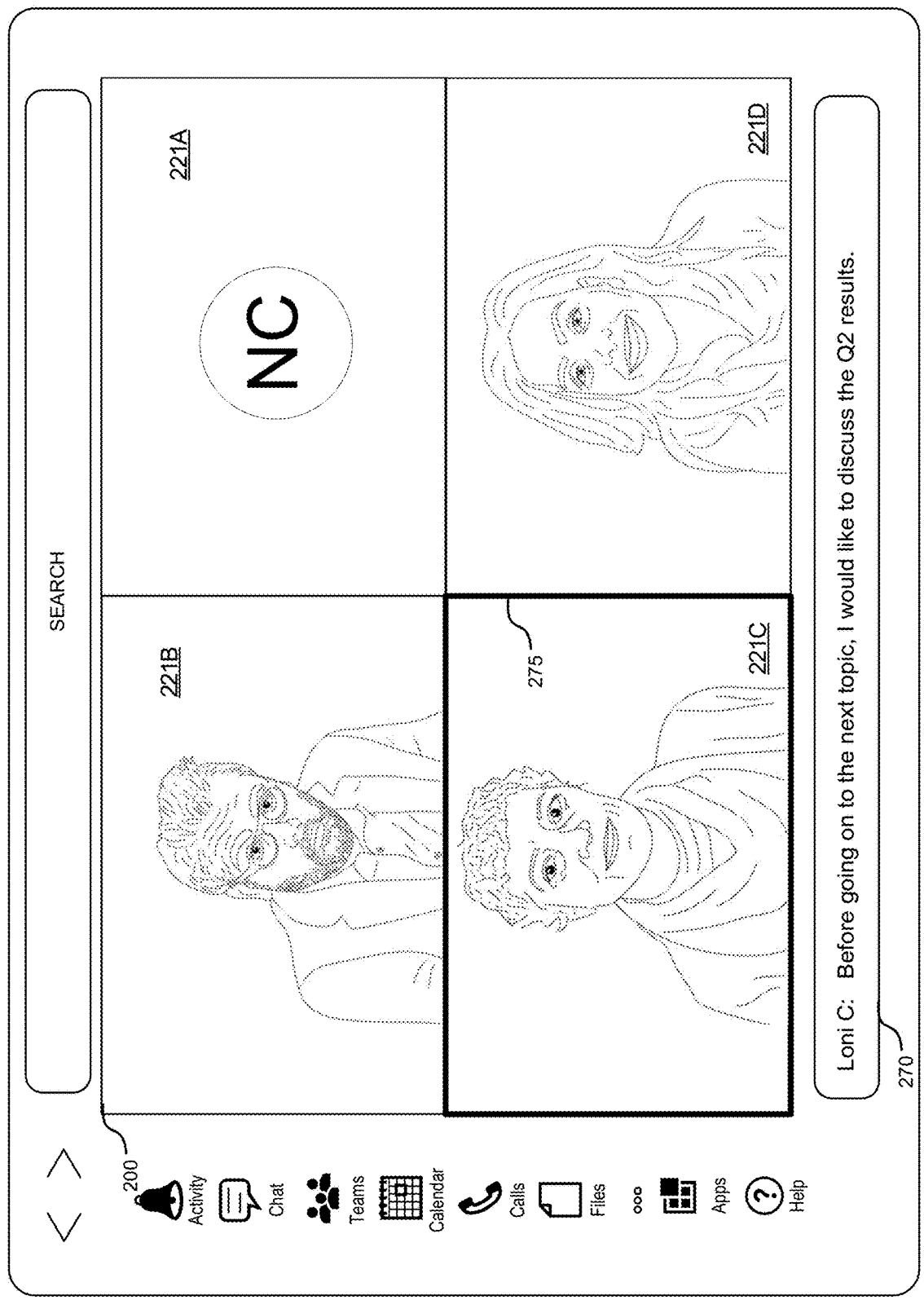
FIG. 2B illustrates an example user interface in accordance with an embodiment.

FIG. 2B illustrates that the participant 221C has entered a question 270. In an embodiment, the border 275 for participant 221C may be updated to show a first level of promotion by highlighted the border 275 or otherwise visually indicating that the participant 221C has entered a question.

Figure 2C:
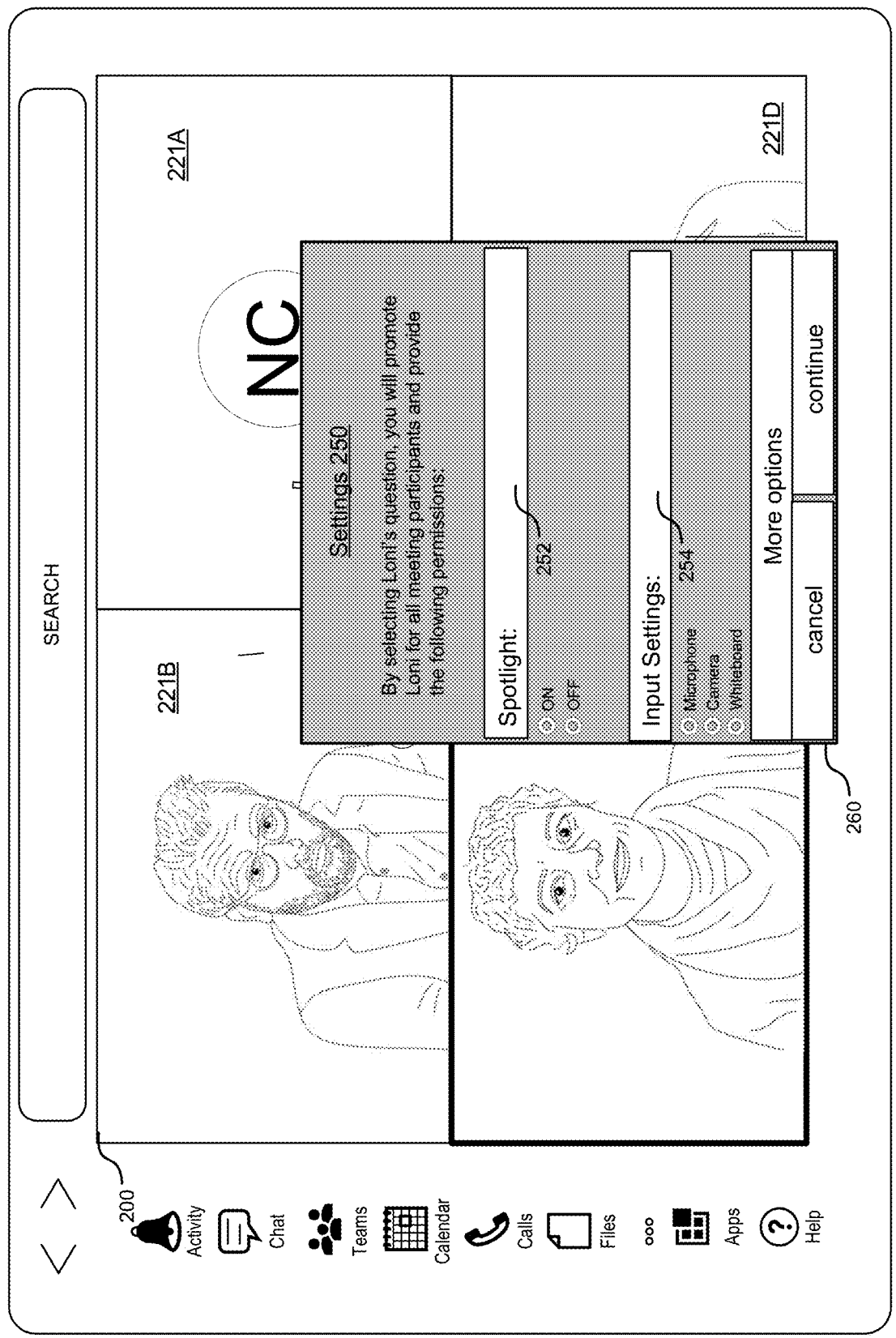
FIG. 2C illustrates an example user interface in accordance with an embodiment.
Figure 2D:
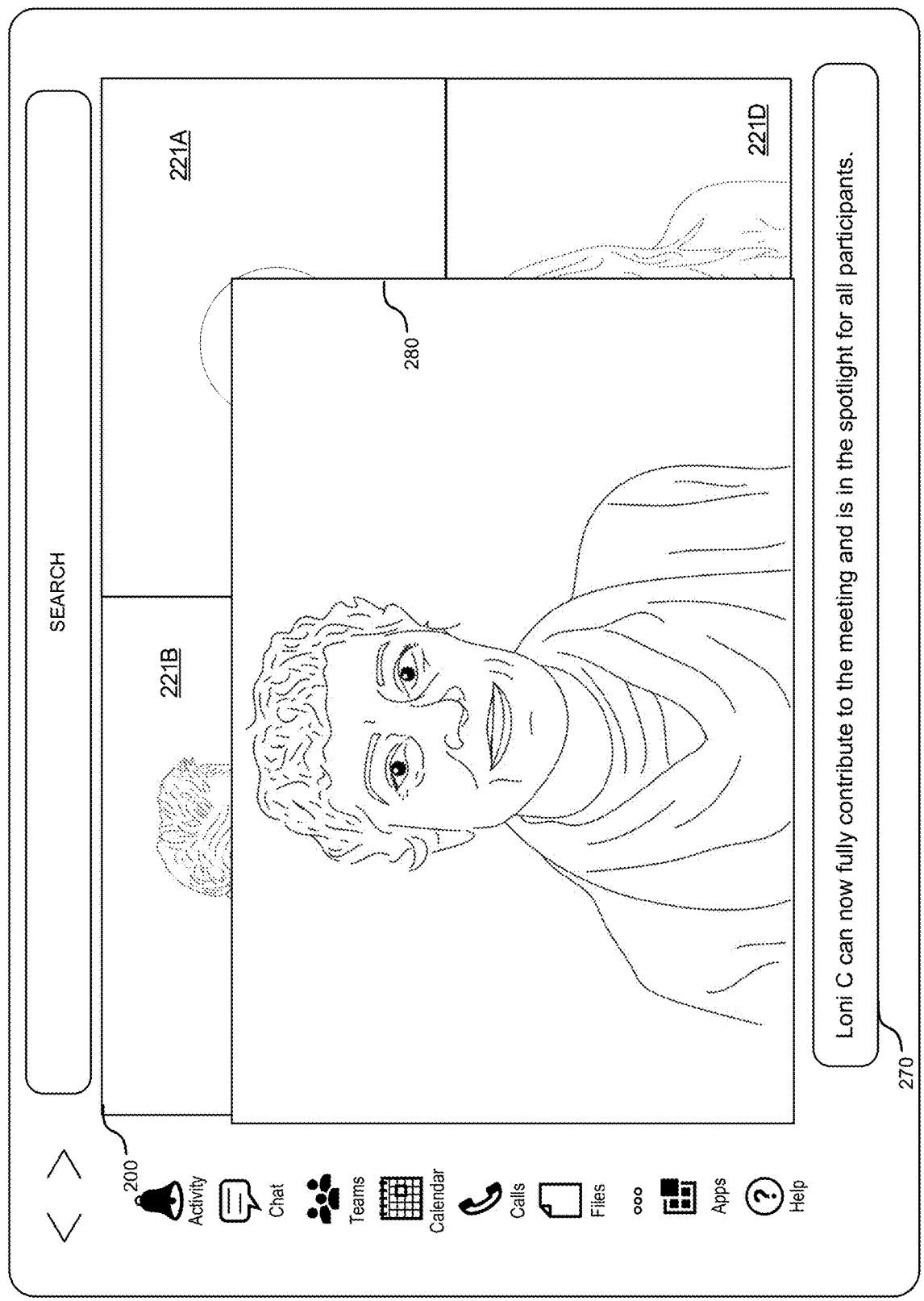
FIG. 2D illustrates an example user interface in accordance with an embodiment.

FIG. 2C illustrates generation of an input pane 260 that allows for the moderator or other user to input preferences for promotion settings 250. In the illustrated example, the promotion settings 250 may include options for spotlighting 252 and input settings 254. Referring to FIG. 2D, when the user selects the options for spotlighting ON, a promoted pane 280 may be rendered that is configured to provide a spotlighted view of the user 221.

Figure 3A:
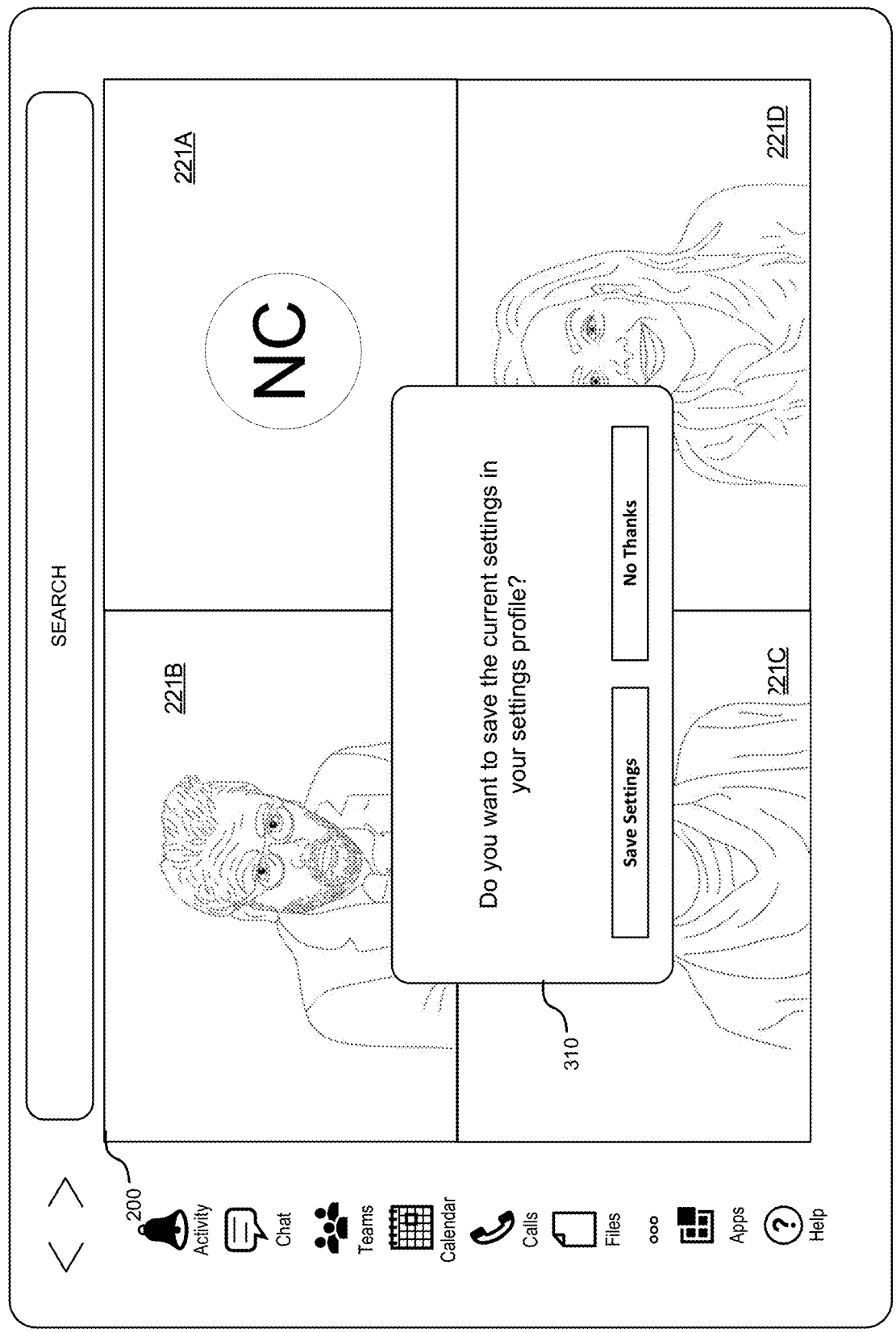
FIG. 3A illustrates an example user interface in accordance with an embodiment.

Turning to FIG. 3A, illustrated is an example user interface 200 showing a collaborative session including four participants 221A, 221B, 221C, and 221D. FIG. 3A illustrates generation of pop-up pane 310 that prompts the user as to whether the user's selected promotion settings, for example the settings selected in FIG. 2C, should be saved. In an embodiment, the user's settings 250 may be saved in a settings profile that may be associated with the user or the session. In the illustrated example, the pop-up pane 310 may include options for accepting the settings into the settings profile, or declining the option.

Figure 3B:
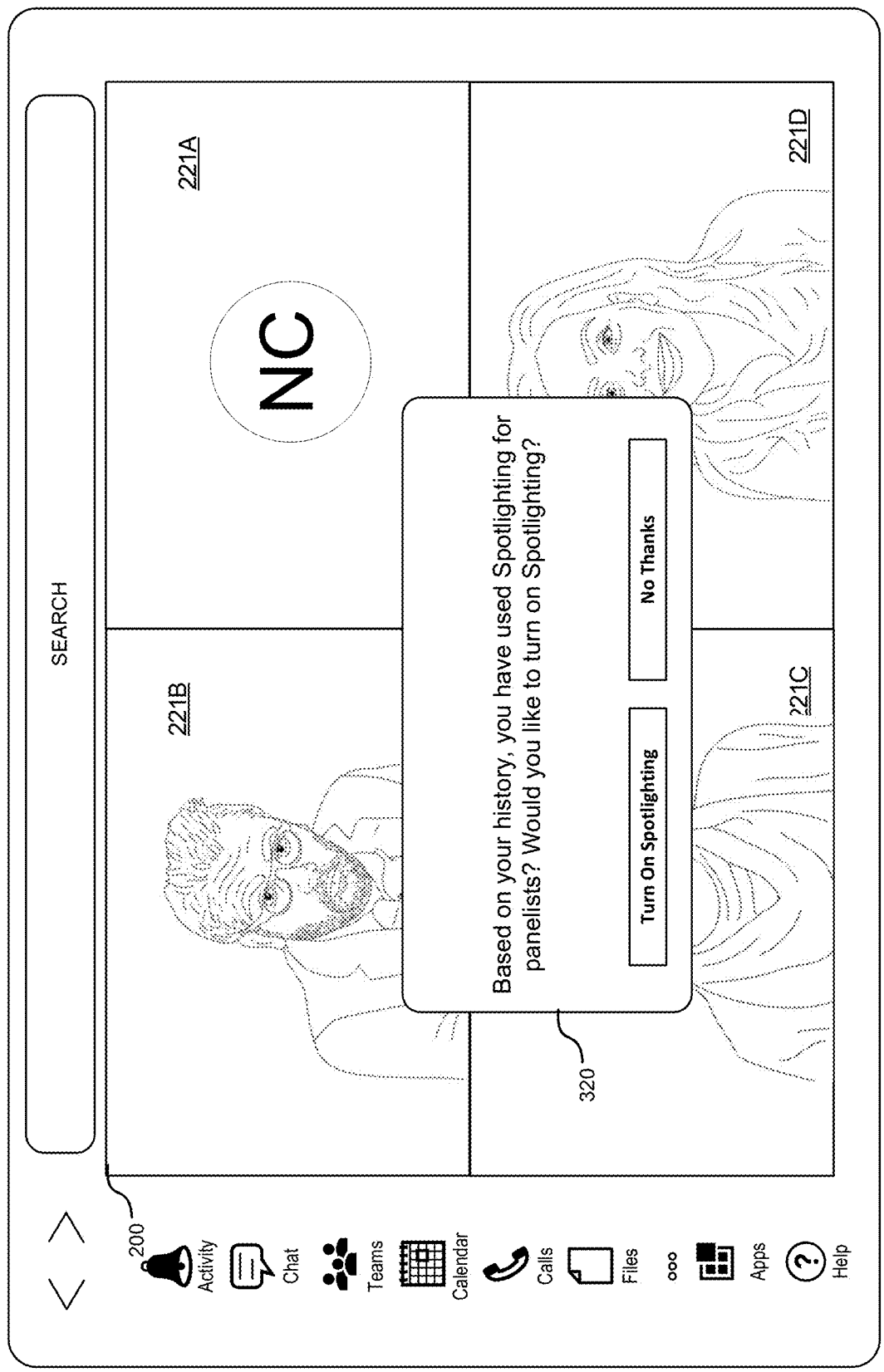
FIG. 3B illustrates an example user interface in accordance with an embodiment.

Turning to FIG. 3B, illustrated is an example user interface 200 showing a collaborative session including four participants 221A, 221B, 221C, and 221D. FIG. 3B illustrates generation of pop-up pane 320 that prompts the user as to whether the user wishes to turn on a feature such as spotlighting. The user may be prompted based on the user's past inputs for settings, for example if the user has previously selected spotlighting during a particular context during the collaborative session. In an embodiment, the user may be prompted based on a threshold such as the user having selected the setting at least X times in the past Y sessions when a participant has raised a question. In the illustrated example, the pop-up pane 320 may include options for turning on the setting or declining the option.

Figure 4:
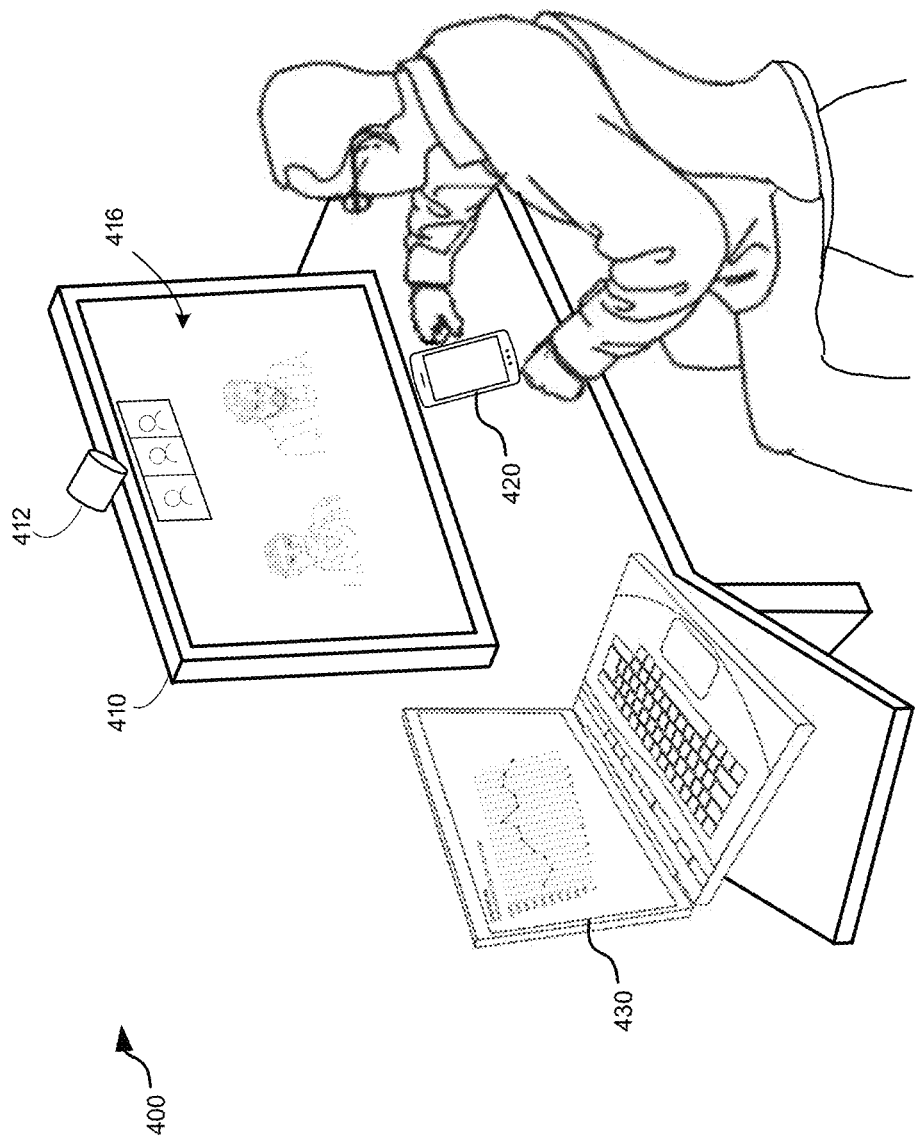
FIG. 4 illustrates an example user environment in accordance with an embodiment.

Turning to FIG. 4, illustrated is an example user computing environment 400 that includes a monitor 410 with input device 412, laptop device 430, and smartphone 420. In one embodiment, a system such as that illustrated in FIG. 1 may detect multiple devices that the user has connected in the computing environment and distribute promotion features/settings across the multiple connected devices to provide an integrated user experience. In an embodiment, the system may distribute various promotion features associated with the engagement automatically based on capabilities of each device. For example, a microphone input function for a collaborative session may be rendered on the smartphone 420, a live view of other users of the collaboration session may be rendered on the monitor 410, and a content view with active transcripts may be rendered on the laptop 430. The system may intelligently select features to be rendered and/or promoted on the devices based on capabilities of each device. For example, one of the users rendered on the monitor 410 may be spotlighted visually, while input promotion may be enabled on the microphone on smartphone 420.

Figure 5:
FIG. 5 illustrates in example of a table storing promotion settings.

In one embodiment, a storage service may be provided that is configured to manage and store promotion settings data. In some embodiments, promotion settings data may be implemented using tables of data. In one implementation, the data may have columns such as ID, Description, User, and TimeDate. Each row of the table may be an instance of a setting. For example, if a moderator has settings for comments, voice, and hand raising, the data for the three settings may be associated with the moderator, a timestamp of the time and date that the settings data were created, and each setting may have different unique IDs. FIG. 5 illustrates one example table 500 showing information pertaining to three settings, each setting having an ID which may conform to a globally unique identifier (GUID) scheme, a description for the setting which may be a text string, the role of the setting which may be a text string or some other identifier, and a date/time that the setting was modified which can be in a date and time format. In some embodiments, each setting may be associated with one or more categories. Examples of categories may include video settings, settings associated with an application or a type of application, settings associated with a particular device or accessory, and the like. The categories can allow for settings to be grouped into groupings or subsets of settings, which can further allow for flexibility in how settings and settings profiles can be stored and used across applications and systems.

In some embodiments, additional or different columns may be included. Examples of columns may include location, type, or purpose. Additionally, columns may contain a file such as an image, document fragment, or an XML/HTML file. In some embodiments, a weight may be associated with each setting that may indicate, for example, how often a user a user has selected the setting. In another example, the weight can be a predetermined value that may indicate the relative weight to be assigned to that setting based on importance, priority, system impact, user preference, or other factors.

Multiple applications or services may read or write the data for a setting, and allow for modifications to the schema of the data. The term "application" may refer to any application, website, add-in, SaaS service, etc. The storage service may receive information from one or more applications that are configured to receive user or system input pertaining to settings data. For example, inputs may be received via communications applications, collaboration applications, document editing applications, audio applications, video applications, etc.

The storage service may be remotely implemented such as on a server, or may be implemented on one or more devices. In some embodiments, the device providing the storage service may be separate from the device where the application is executing. The application may read and/or write data to the storage service over a network. In some implementations, the schema of the data may include a column containing a list of who has permissions for certain promoted functions. The permissions may indicate, for example, that only an authenticated user such as BobSmith@Contoso.com and FredJacoby@Contoso.com may be promoted to have camera permissions. APIs may also be exposed to allow programs to request or retrieve relevant settings data, such as those that the users have access to or are engaged with because of a shared task or project.

Settings data may be created and edited using any application that is capable of receiving user inputs and processing the inputs to generate or modify information pertaining to a setting. In an embodiment, the settings data may be saved using a relatively simple form in the storage service, even when modified using a more complex editing application.

Figure 6:
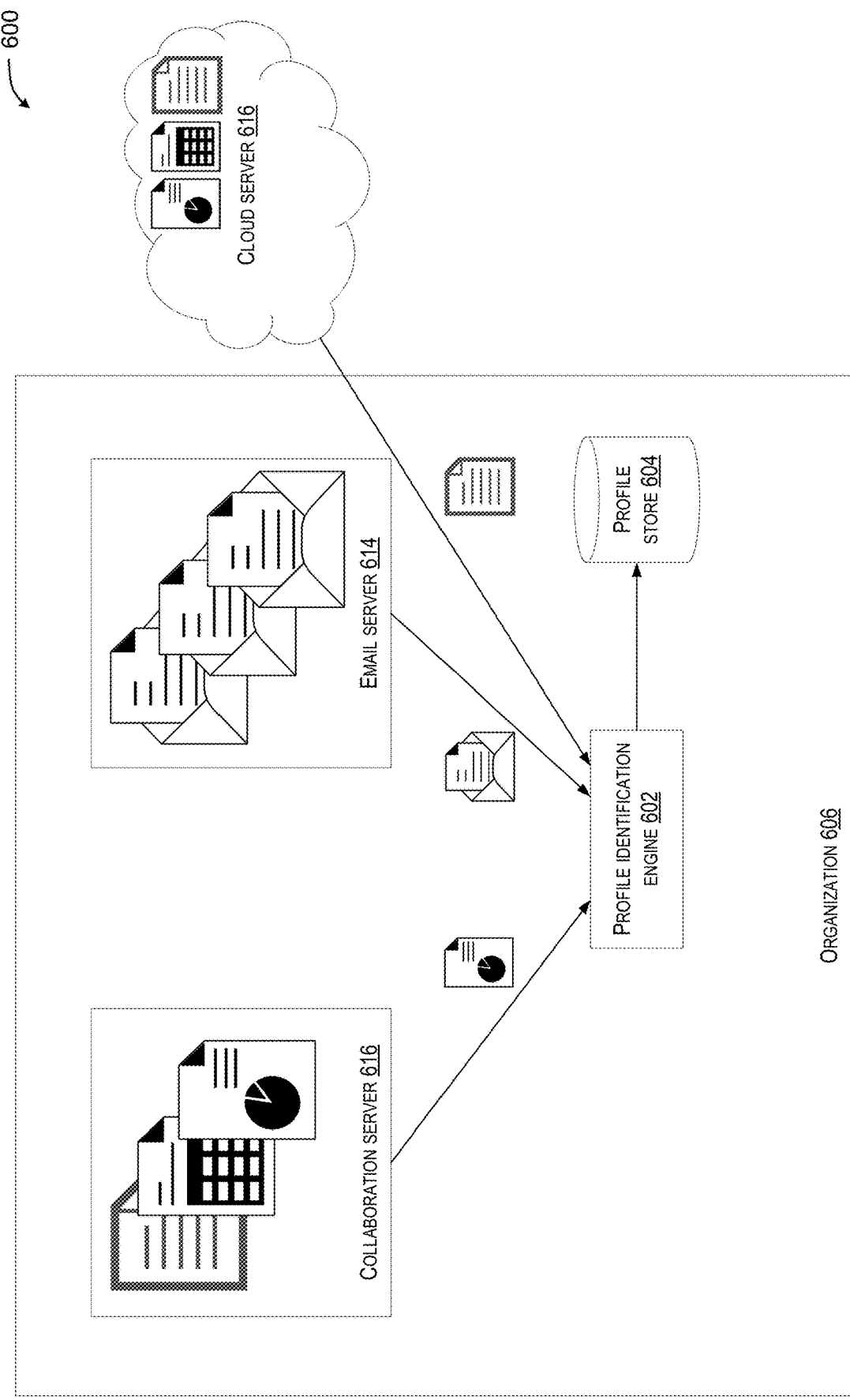
FIG. 6 illustrates a block diagram for identifying promotion settings and providing them to applications.

FIG. 6 illustrates a block diagram 600 for generating, storing, and using promotion settings profiles in conjunction with a team or organization 606. In some embodiments, profile identification engine 602 receives settings profiles to be processed from collaboration server 616, email server 614, cloud server 616, or the like. In some embodiments, the profiles stored on these servers may be associated with organization 606. This enables profiles to be identified that are particular to organization 606.

For example, collaboration server 616 may store slide presentations, spreadsheets, word processing documents, emails, calendar appointments, or the like. In some embodiments, profile identification engine 602 may have access to retrieve the documents stored in collaboration server 616. Additionally or alternatively, collaboration server 616 may provide stored settings or profiles to profile identification engine 602. Profile identification engine 602 may also be implemented as an add-in executing within collaboration server 616.

Profile identification engine 602 may similarly receive settings or profiles from email server 614. These settings or profiles may pertain to emails, attachments, or any other type of document. In some embodiments, while cloud document server 616 exists physically outside of organization 606, the data contained thereon may still be considered part of the organization.

Figure 7:
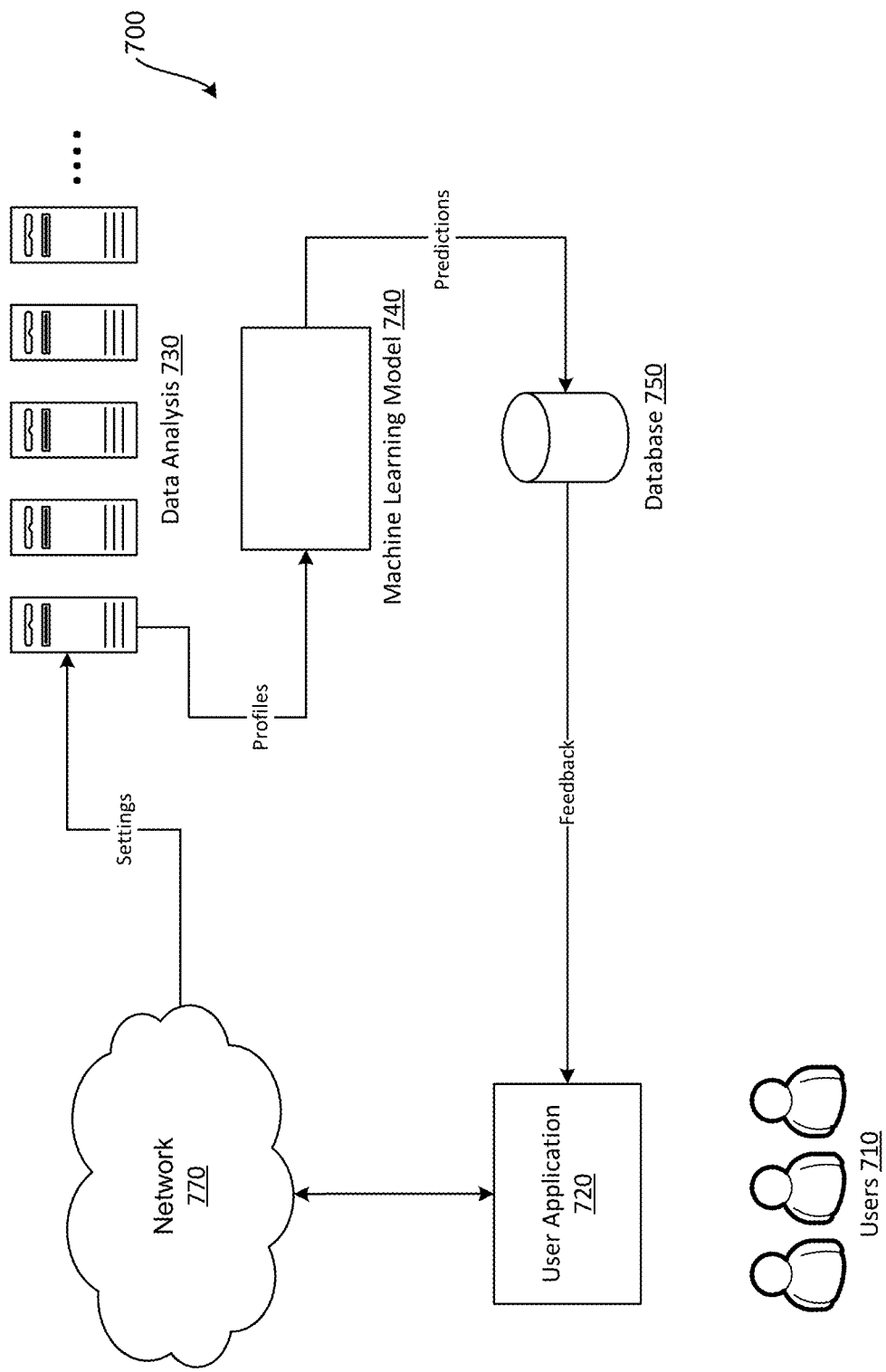
FIG. 7 illustrates aspects of a system for managing promotion settings.

FIG. 7 is a computing system architecture diagram showing an overview of a system disclosed herein for a promotion settings system, according to one embodiment disclosed herein. As shown in FIG. 7, a promotion settings system 700 (which might also be referred to herein as an "settings system") may be configured to receive, store, send, and predict settings based upon various user data ("user data") generated by data analysis components 730 (which might be referred to individually as an "data analysis component 730" or collectively as the "data analysis components 730").

The data analysis components 730 may, for example, include, but are not limited to, physical computing devices such as server computers or other types of hosts, associated hardware components (e.g. memory and mass storage devices), and networking components (e.g. routers, switches, and cables). The data analysis components 730 can also include software, such as operating systems, applications, and containers, network services, virtual components, such as virtual disks, virtual networks, and virtual machines. The database 750 can include data, such as a database, or a database shard (i.e. a partition of a database). The feedback may be used to predict a user setting that is used to update the user application 720 that provided the updated information to various users 710.

In some configurations, a machine learning model 740 may be configured to utilize supervised and/or unsupervised machine learning technologies to predict promotion settings. For example, the machine learning model 740 may utilize supervised machine learning techniques by training on tracking data that describes various user settings data as described herein. The machine learning model 740 may also, or alternately, utilize unsupervised machine learning techniques to predict settings including, but not limited to, a clustering-based model 310, a forecasting-based model 370, a smoothing-based model 330, or another type of unsupervised machine learning model.

In some embodiments, the user data may be analyzed to identify trends and patterns related to promotion settings and determine which settings may influence user behavior and interaction, and in some cases, which settings may be related to an increased likelihood of user behavior such as increasing the likelihood of participating in a collaboration event such as a meeting. In one embodiment, the machine learning model 740 may incorporate a classification function that may be configured to determine which user data patterns and settings are relevant for a particular objective. The classification function may, for example, continuously learn which user data patterns and settings are relevant to various potential outcomes. In some embodiments, supervised learning may be incorporated where the machine learning model may classify observations made from various user inputs. The machine learning model may assign metadata to the observations. The metadata may be updated by the machine learning model to update relevance to the objectives of interest as new observations are made and assign tags to the new observations. The machine learning model may learn which observations are alike and assign metadata to identify these observations. The machine learning model may classify future observations into categories.

In some embodiments, an algorithm, such as a feature subset selection algorithm or an induction algorithm, may be implemented to define groupings or categories. Probabilistic approaches may also be incorporated. One or more estimation methods may be incorporated, such as a parametric classification technique. In various embodiments, the machine learning model may employ a combination of probabilistic and heuristic methods to guide and narrow the data that are analyzed.

In order to provide relevant results that are more likely to indicate outcomes for a particular observed pattern of data, the most relevant patterns may be identified and weighted.

In some embodiments a heuristic model can be used to determine settings that provide an acceptable confidence level in the results. For example, experience-based techniques, such as expert modeling can be used to aid in the initial selection of parameters. The heuristic model can probabilistically indicate parameters of likely impact through, for example, tagging various metadata related to a particular pattern. Feedback from an initial round of analysis can be used to further refine the initial selection, thus implementing a closed loop system that generates likely candidates for settings in situations where programmatic approaches may be impractical or infeasible. As an example, Markov modeling or variations thereof (e.g., hidden Markov model and hierarchical hidden Markov model) can be used in some embodiments to identify candidate polling frequencies that may otherwise be missed using traditional methods.

As shown in FIG. 7, the machine learning model 740 can generate predictions (which might be referred to herein simply as a "prediction") based on features extracted from the user and settings information. The predictions can be provided in various forms, such as a single setting, or a schedule of settings that may change over time.

Figure 8:
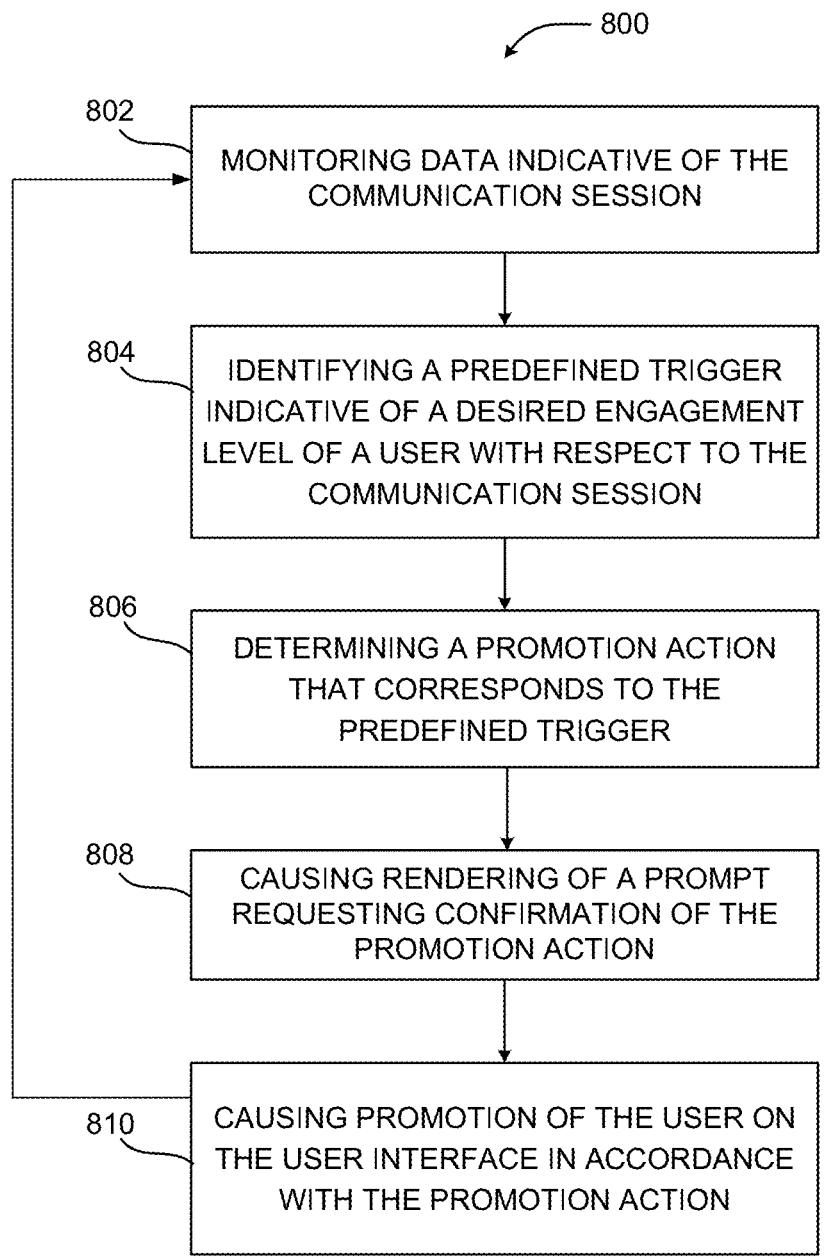
FIG. 8 illustrates a routine for managing promotion settings according to one embodiment.

FIG. 8 is a flow diagram illustrating aspects of a routine 800 to be performed by a data processing system for promoting users in a communication session. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 800 is described as running on a system 80, it can be appreciated that the routine 800 and other operations described herein can be executed on an individual computing device, e.g., computing device 84, or several devices.

Additionally, the operations illustrated in FIG. 8 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 800 begins at operation 802, which illustrates monitoring data indicative of the communication session.

Operation 804 illustrates identifying a predefined trigger indicative of a desired engagement level of a user with respect to the communication session.

Operation 806 illustrates determining a promotion action that corresponds to the predefined trigger. In an embodiment, the promotion action includes at least a promotion of the user on a user interface representing the communication session.

Operation 808 illustrates causing rendering of a prompt requesting confirmation of the promotion action.

Operation 810 illustrates in response to confirmation of the promotion action, causing promotion of the user on the user interface in accordance with the promotion action.

Figure 9:
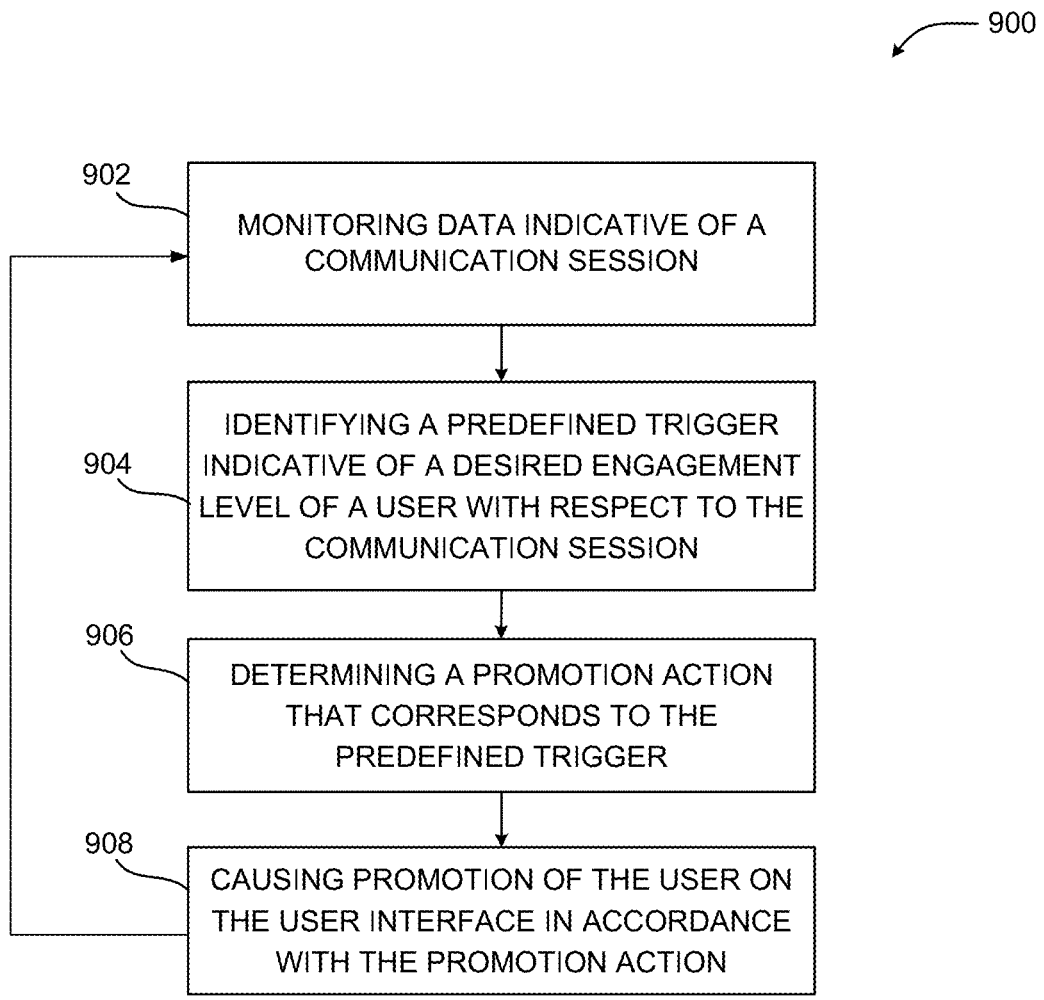
FIG. 9 illustrates a routine for managing promotion settings according to one embodiment.

FIG. 9 is a flow diagram illustrating aspects of a routine 900 for promoting users in a communication session.

The routine 900 begins at operation 902, where the system monitors data indicative of a communication session.

At operation 904, the system can identify a predefined trigger indicative of a desired engagement level of a user with respect to the communication session.

At operation 906, the system can determine a promotion action that corresponds to the predefined trigger. In an embodiment, the promotion action includes at least a promotion of the user on a user interface representing the communication session.

At operation 908, the system can cause promotion of the user on the user interface in accordance with the promotion action.

Figure 10:
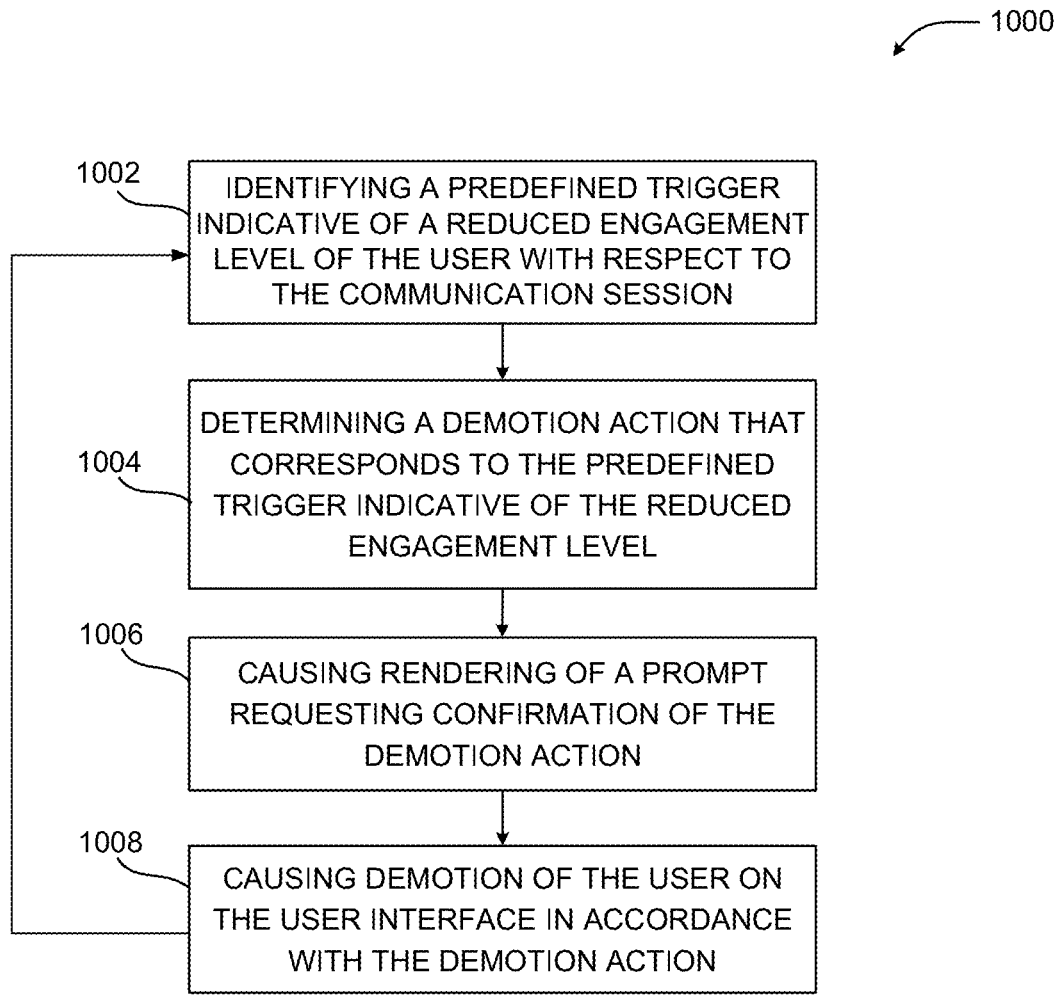
FIG. 10 illustrates a routine for managing promotion settings according to one embodiment.

FIG. 10 is a flow diagram illustrating aspects of a routine 900 for promoting users in a communication session.

The routine 1000 begins at operation 1002, where the system identifies a predefined trigger indicative of a reduced engagement level of the user with respect to the communication session.

At operation 1004, the system determines a demotion action that corresponds to the predefined trigger indicative of the reduced engagement level, wherein the demotion action includes at least a demotion of the user on the user interface.

At operation 1006, the system can cause rendering of a prompt requesting confirmation of the demotion action.

At operation 1008, the system can, in response to confirmation of the demotion action, cause demotion of the user on the user interface in accordance with the demotion action.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
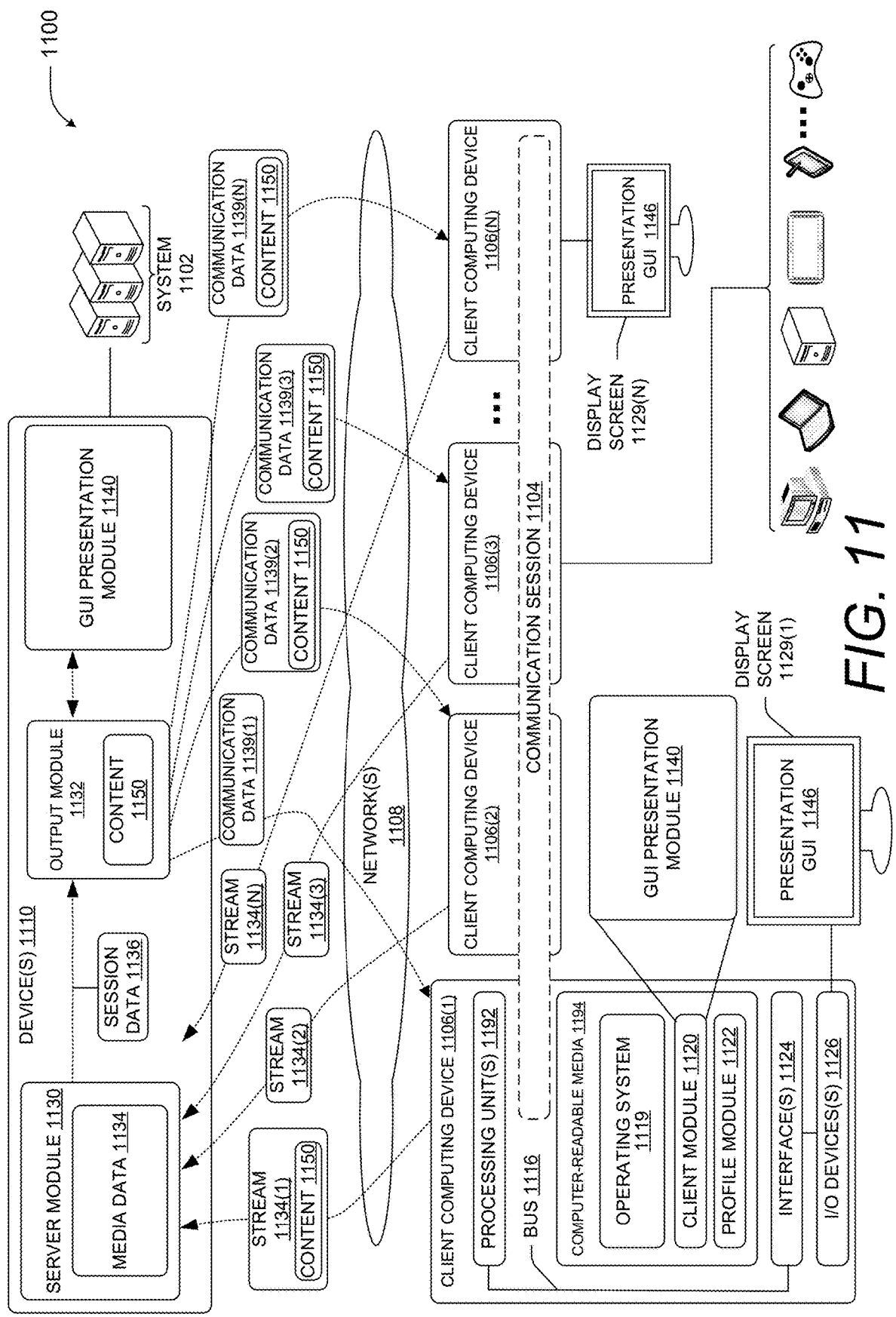
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, and share content that is displayed to users of a communication session 1104. As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104. The client computing devices 1106 can correlate to the user computing devices 106 shown in FIG. 1. Although some examples show one of the computers 1106 processing aspects of the present techniques, it can be appreciated that the techniques disclosed herein can be applied to other computing devices and are not to be construed as limiting.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In the examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations. Each stream can also include text, audio and video data, such as the data communicated within a channel, chat board, or a private messaging service.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) (which are also referred to herein as computing devices 104A-104N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices (not shown in FIG. 11) to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) (each of which are also referred to herein as a "data processing system") may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(3) participating in a live viewing of the communication session). The communication data 1139 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1139 that is for delivery to one or more of the client computing devices 1106. Specifically, the GUI presentation module 1140, at the device(s) 1110 and/or the client computing device 1106, may analyze communication data 1139 to determine an appropriate manner for displaying video, image, and/or content on the display screen 1129(1) of an associated client computing device 1106. In some implementations, the GUI presentation module 1140 may provide video, image, and/or content to a presentation GUI 1146 rendered on the display screen 1129(1) of the associated client computing device 1106. The presentation GUI 1146 may be caused to be rendered on the display screen 1129(1) by the GUI presentation module 1140. The presentation GUI 1146 may include the video, image, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, and a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had while viewing the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
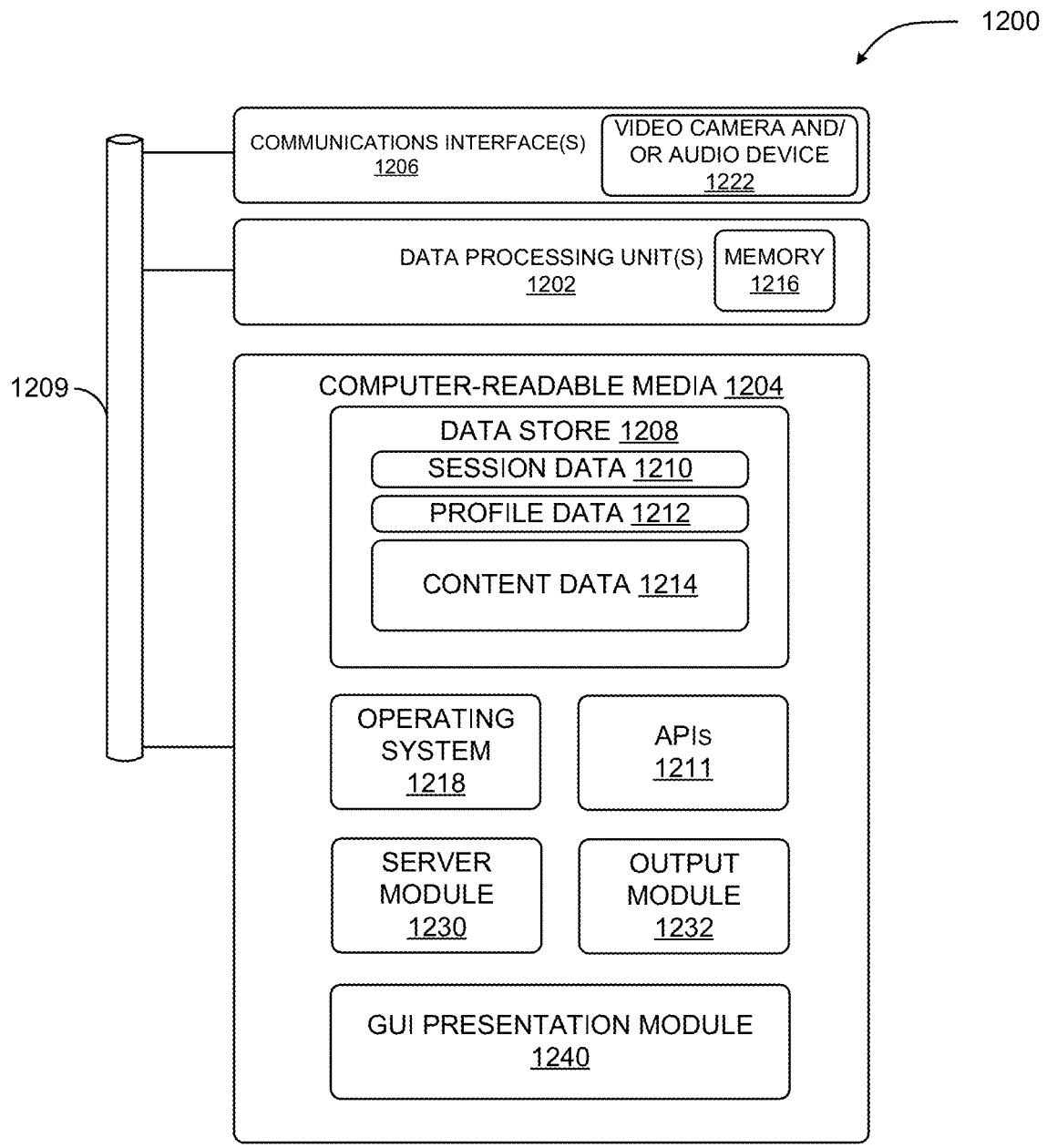
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device") configured to generate data for some of the user interfaces disclosed herein. The device 1200 may generate data that may include one or more sections that may render or comprise video, images, virtual objects, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") (not shown in FIG. 12) or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210 (e.g., session data 1136), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1211 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The disclosure presented herein also encompasses the subject matter set forth in the following clauses:

Clause 1: A machine-implemented method for promoting users in a communication session, the method comprising:
  monitoring data indicative of the communication session;
  identifying a predefined trigger indicative of a desired engagement level of a user with respect to the communication session;
  determining a promotion action that corresponds to the predefined trigger, wherein the promotion action includes at least a promotion of the user on a user interface representing the communication session;
  causing rendering of a prompt requesting confirmation of the promotion action; and
  in response to confirmation of the promotion action, causing promotion of the user on the user interface in accordance with the promotion action.

Clause 2: The method of clause 1, wherein the promotion action comprises visually accenting the user on the user interface.

Clause 3: The method of any of clauses 1-2, wherein the promotion action comprises a permission to allow audio input to the communication session.

Clause 4: The method of any of clauses 1-3, wherein the promotion action comprises a permission to allow video input to the communication session.

Clause 5: The method of any of clauses 1-4, further comprising causing an initial level of promotion of the user on the user interface, wherein the promotion of the user is an additional level of promotion.

Clause 6: The method of any of clauses 1-5, wherein the promotion action is based on a role of the user.

Clause 7: The method of clauses 1-6, wherein the role is determined based on an agenda of the communication session.

Clause 8: The method of any of clauses 1-7, wherein the predefined trigger is based on a user input to the communication session.

Clause 9: The method of any of clauses 1-8, wherein the predefined trigger is based on a detected gesture by the user.

Clause 10: The method of any of clauses 1-9 further comprising:
  identifying a predefined trigger indicative of a reduced engagement level of the user with respect to the communication session;
  determining a demotion action that corresponds to the predefined trigger indicative of the reduced engagement level, wherein the demotion action includes at least a demotion of the user on the user interface;
  causing rendering of a prompt requesting confirmation of the demotion action; and in response to confirmation of the demotion action, causing demotion of the user on the user interface in accordance with the demotion action.

Clause 11: A system, comprising:
  one or more data processing units; and
  a computer-readable medium having encoded thereon computer-executable instructions to cause the one or more data processing units to perform operations comprising:
  monitoring data indicative of a communication session;
  identifying a predefined trigger indicative of a desired engagement level of a user with respect to the communication session;
  determining a promotion action that corresponds to the predefined trigger, wherein the promotion action includes at least a promotion of the user on a user interface representing the communication session; and
  causing promotion of the user on the user interface in accordance with the promotion action.

Clause 12: The system of clause 11, wherein the promotion action is role-based.

Clause 13: The system of any of clauses 11 and 12, wherein each of a plurality of roles is associated with promotion actions specific to characteristics of each role.

Clause 14: The system of any clauses 11-13, further comprising computer-executable instructions to cause the one or more data processing units to determine, based on a context of the communication session, that a moderator should be prompted as to whether the promotion action should be applied.

Clause 15: The system of any clauses 11-14, wherein the determination is based on usage and monitoring of the moderator's prior actions.

Clause 16: A system, comprising:
  means for monitoring data indicative of a communication session;
  means for identifying a predefined trigger indicative of a desired engagement level of a user with respect to the communication session;
  means for determining a promotion action that corresponds to the predefined trigger, wherein the promotion action includes at least a promotion of the user on a user interface representing the communication session;
  means for causing rendering of a prompt requesting confirmation of the promotion action; and
  in response to confirmation of the promotion action, means for causing promotion of the user on the user interface in accordance with the promotion action.

Clause 17: The system of clause 16, wherein the promotion action is determined using machine learning.

Clause 18: The system of any of clauses 16 and 17, further comprising:
  means for storing the promotion action at a cloud-based storage; and
  means for enabling access to the stored promotion action to remote systems and devices.

Clause 19: The system of any of the clauses 16-18, wherein the promotion action is further determined based on usage and monitoring of the user's selections.

Clause 20: The system of any of the clauses 16-19, wherein the promotion action is role-based and each of a plurality of roles is associated with a settings profile specific to characteristics of each role.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claims is:

1. A machine-implemented method for promoting users in a communication session, the method comprising:
   detecting a user input that corresponds to a first predefined trigger indicative of a desired engagement level of a user participating in a communication session;
   responsive to the detected user input corresponding to the predefined trigger, activating a first promotion action that corresponds to the first predefined trigger, wherein the first promotion action includes at least a first visual indication that the user has been promoted on a user interface;
   detecting a second predefined trigger indicative of a further engagement level of the user with respect to the communication session;
   receiving input indicative of settings for a second level of promotion corresponding to the further engagement level of the user; and
   in response to receiving the settings for the second level of promotion, causing a second promotion action of the user on the user interface in accordance with the settings for the second level promotion and modifying a privilege of the user to add or modify a permission associated with a feature of the communication session.

2. The method of claim 1, wherein the first or second promotion action comprises visually accenting the user on the user interface.

3. The method of claim 1, wherein the first or second promotion action comprises a permission to allow audio input to the communication session.

4. The method of claim 1, wherein the first or second promotion action comprises a permission to allow video input to the communication session.

5. The method of claim 1, wherein the first or second promotion action comprises applying background effects.

6. The method of claim 1, wherein the first or second promotion action is based on a role of the user.

7. The method of claim 6, wherein the role is a panelist.

8. The method of claim 1, wherein the first or second promotion action comprises a rendering of a name, role, or other personal information.

9. The method of claim 1, wherein the first predefined trigger is based on a user input or a detected gesture by the user.

10. The method of claim 1, further comprising:
    identifying a third predefined trigger indicative of a reduced engagement level of the user with respect to the communication session;
    determining a demotion action that corresponds to the third predefined trigger indicative of the reduced engagement level, wherein the demotion action includes at least a demotion of the user on the user interface;
    causing rendering of an additional prompt requesting confirmation of the demotion action; and
    in response to the confirmation of the demotion action, causing demotion of the user on the user interface in accordance with the demotion action.

11. A system, comprising:
    one or more data processing units; and
    a computer-readable medium having encoded thereon computer-executable instructions to cause the one or more data processing units to perform operations comprising:
    detecting a first input that corresponds to a first predefined trigger indicative of a desired engagement level of a user participating in a communication session;
    responsive to receiving a second input granting the desired engagement level of the user, activating a first promotion action that corresponds to the first predefined trigger, wherein the first promotion action includes at least a first visual indication that the user has been promoted on a user interface;
    detecting a second predefined trigger indicative of a further engagement level of the user with respect to the communication session;
    receiving input indicative of settings for a second level of promotion; and
    responsive to detecting the second predefined trigger and receiving the settings for the second level of promotion, causing a second promotion action of the user on the user interface in accordance with the settings for the second level of promotion and modifying a privilege of the user to add or modify a permission associated with a feature of the communication session.

12. The system of claim 11, wherein the first or second promotion action is role-based.

13. The system of claim 12, wherein each of a plurality of roles is associated with promotion actions specific to characteristics of each role.

14. The system of claim 11, further comprising computer-executable instructions to cause the one or more data processing units to determine, based on a context of the communication session, that a moderator should be prompted as to whether the first or second promotion action should be applied.

15. The system of claim 14, wherein the determination is based on usage and monitoring of the moderator's prior actions.

16. A system, comprising:
    means for detecting a user input that corresponds to a first predefined trigger indicative of a desired engagement level of a user participating in a communication session;
    responsive to the detected user input corresponding to the predefined trigger, means for activating a first promotion action that corresponds to the first predefined trigger, wherein the first promotion action includes at least a first visual indication that the user has been promoted on a user interface representing the communication session;
    means for detecting a second predefined trigger indicative of a further engagement level of the user with respect to the communication session;
    means for receiving settings for a second level of promotion; and
    in response to detecting the second predefined trigger and receiving the settings for the second level of promotion, means for causing a second promotion action of the user on the user interface in accordance with the settings for the second level of promotion and modifying a privilege of the user to add or modify a permission associated with a feature of the communication session.

17. The system of claim 16, wherein the first or second promotion action is determined using machine learning.

18. The system of claim 16, further comprising:
    means for storing the first or second promotion action at a cloud-based storage; and
    means for enabling access to the stored first or second promotion action to remote systems and devices.

19. The system of claim 16, wherein the first or second promotion action is further determined based on usage and monitoring of the user's selections.

20. The system of claim 16, wherein the first or second promotion action is role-based and each of a plurality of roles is associated with a settings profile specific to characteristics of each role.

* * * * *